US009100834B2

(12) United States Patent
Guey et al.

(10) Patent No.: US 9,100,834 B2
(45) Date of Patent: Aug. 4, 2015

(54) UPLINK REFERENCE SIGNAL ALLOCATION AND ASSIGNMENT FOR CELL CLUSTERS

(75) Inventors: Jiann-Ching Guey, Fremont, CA (US); Ylva Jading, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 984 days.

(21) Appl. No.: 13/145,622

(22) PCT Filed: Mar. 30, 2009

(86) PCT No.: PCT/SE2009/050332
§ 371 (c)(1),
(2), (4) Date: Jul. 21, 2011

(87) PCT Pub. No.: WO2010/085190
PCT Pub. Date: Jul. 29, 2010

(65) Prior Publication Data
US 2011/0275397 A1   Nov. 10, 2011

Related U.S. Application Data

(60) Provisional application No. 61/146,853, filed on Jan. 23, 2009.

(51) Int. Cl.
*H04W 72/00* (2009.01)
*H04W 36/00* (2009.01)
*H04W 16/12* (2009.01)

(52) U.S. Cl.
CPC ................................... *H04W 16/12* (2013.01)

(58) Field of Classification Search
CPC .................................................. H04W 16/04
USPC ...................... 455/509, 452.1, 450
See application file for complete search history.

(56) References Cited

U.S. PATENT DOCUMENTS 7,710,919 B2 *  5/2010  Woo et al. ............... 370/329
7,903,619 B2 *  3/2011  Yun et al. ............... 370/337
(Continued)

FOREIGN PATENT DOCUMENTS

CN   101005471 A    7/2007
EP     2071856 A1    6/2009
(Continued)

OTHER PUBLICATIONS

3rd Generation Partnership Project. "Pilot Sequence Allocation Method in E-UTRA Uplink." 3GPP TSG RAN WG1 Meeting #46, R1-062103, Tallinn, Estonia, Aug. 28-Sep. 1, 2006.
(Continued)

*Primary Examiner* — Tilahun B Gesesse
(74) *Attorney, Agent, or Firm* — Coats & Bennett, P.L.L.C.

(57) ABSTRACT

The inventive methods and apparatus disclosed herein allocate and assign uplink reference signals to cells (104, 106) within a cell cluster (100, 302, 402, 502) based on the type of cell. According to an embodiment, uplink reference signals are allocated within a cell cluster (100, 102, 302, 402, 502) by partitioning a set of uplink reference signals allocated to the cell cluster (100, 102, 302, 402, 502) into mutually exclusive subsets of uplink reference signals. One of the subsets is allocated to each of the border cells (104) and the entire set of uplink reference signals is allocated to the interior cells (106). Accordingly, more uplink reference signals are available for assignment to mobile devices (310, 410, 510) served by the interior cells (106) than by the border cells (104). In one embodiment, uplink reference signals are statically or semi-dynamically assigned to mobile devices (310, 410, 510) served within the border cells (104) and dynamically assigned to mobile devices (310, 410, 510) served within the interior cells (106).

15 Claims, 5 Drawing Sheets

(56) References Cited

U.S. PATENT DOCUMENTS

| | | | |
|---|---|---|---|
| 7,912,470 B2* | 3/2011 | Ashish et al. | 455/448 |
| 8,126,403 B2* | 2/2012 | Wang Helmersson et al. | 455/63.1 |
| 8,144,658 B2* | 3/2012 | Damnjanovic et al. | 370/330 |
| 2005/0037763 A1* | 2/2005 | Hamamoto et al. | 455/447 |
| 2007/0086406 A1* | 4/2007 | Papasakellariou | 370/343 |
| 2007/0115878 A1* | 5/2007 | Ashish et al. | 370/329 |
| 2009/0005058 A1* | 1/2009 | Kazmi et al. | 455/452.1 |
| 2009/0131057 A1* | 5/2009 | Dimou | 455/436 |

FOREIGN PATENT DOCUMENTS

| | | | |
|---|---|---|---|
| WO | 2005032004 A1 | 4/2005 | |
| WO | 2006/086788 A1 | 8/2006 | |
| WO | 2006086788 A1 | 8/2006 | |
| WO | 2008/044553 A1 | 4/2008 | |

OTHER PUBLICATIONS

3rd Generation Partnership Project. "Collaborative MIMO for LTE-A Downlink." 3GPP TSG RAN WG1 Meeting #53bis, R1-082501, Warsaw, Poland, Jun. 30-Jul. 4, 2008.

WiMAX Forum. "Mobile WiMAX—Part I: A Technical Overview and Performance Evaluation." Aug. 2006. Available online at: http://www.wimaxforum.org/technology/downloads/Mobile_WiMAX_Part1_Overview_and_Performance.pdf.

Parkvall, S. et al. "LTE-Advanced—Evolving LTE towards IMT-Advanced." IEEE 68th Vehicular Technology Conference, Piscataway, NJ, USA, Sep. 21, 2008.

* cited by examiner

UPLINK REFERENCE SIGNAL ALLOCATION AND ASSIGNMENT FOR CELL CLUSTERS

TECHNICAL FIELD

The present invention relates generally to wireless communication systems, and in particular relates to methods and apparatus for allocating and assigning uplink reference signals in a cell cluster.

BACKGROUND

A Distributed Antenna System (DAS) generally refers to a radio access architecture consisting of a large number of antennas (or radio heads) distributed widely across a large area and connected to a centralized processing center. Each group of antennas covers an area commonly referred to as a cell. The total area covered by the multiple antennas connecting to the same central unit is referred to as a DAS cell cluster, to be distinguished from the cell in a conventional system. Unlike a conventional cellular system in which signals transmitted and received by each antenna are processed individually at the base station attached thereto, a DAS has complete control of all the widely distributed antennas and can therefore coordinate their transmission and reception to minimize interference and achieve high capacity. More recent advancements in distributed antenna systems have given rise to the CoMP system (Coordinated Multipoint Transmission and Reception) used in 3GPP ($3^{rd}$ Generation Partnership Project). A CoMP cell cluster also includes several cells each of which has one or more antennas for providing radio coverage.

DAS and CoMP systems must have sufficient knowledge of the channel responses between the terminals and the distributed antennas to effectively suppress interference. Such knowledge is typically estimated through the uplink transmission of known signals commonly referred to as sounding reference signals, reference signals or pilot signals, hereinafter referred to generally as reference signals. The accuracy of the channel estimates depends heavily on the selection and deployment of the uplink reference signals. Uplink reference signal allocation and assignment becomes even more complicated when there are multiple neighboring DAS or CoMP cell clusters with non-coordinating processing centers, i.e., processing centers which do not coordinate transmissions amongst cell clusters.

Accurate uplink channel estimates are essential to the coherent demodulation of uplink data transmitted by terminals served within a cell cluster. Accurate uplink channel estimates are also critical for downlink transmission in the case of Time Division Duplex (TDD) systems which can derive the downlink channel responses from the uplink channel estimates.

In a conventional system such as Long Term Evolution (LTE), each base station is allocated a set of uplink reference signals which is orthogonal to those allocated to a neighboring cell. The base station then assigns uplink reference signals selected from this set to the terminals it is serving. The base station uses reference signals received from the terminals to perform channel estimation and perform coherent demodulation. Neighboring cells are allocated mutually exclusive sets whereas the same set of signals can be reused by other cells that are separated so that no or only limited interference occurs between the cells. Examples for the orthogonal reference signal set can be different cyclic shifts of a base sequence such as Zadoff-Chu sequence, m-sequence or Costas sequence. Another possibility is that the uplink reference signals are made orthogonal in the time-frequency domain for an Orthogonal Frequency Division Multiplexing (OFDM) system.

In each case, the static reuse of orthogonal reference signal sets may be sufficient for a conventional system in which each base station serves only one terminal at a time. However, for a DAS or CoMP cell cluster, multiple users are served simultaneously by a processing center. The number of orthogonal signals may not be sufficient to adequately serve all terminals if a conventional static reuse method is adopted at the DAS or CoMP cell level. Furthermore, restricting the interior cells of a DAS or CoMP cell cluster from reusing signals allocated to a neighboring cell cluster is unnecessary since the interior cells are shielded by the boundary antennas of the cell cluster. A conventional static reuse approach can be adopted at the antenna level. In other words, the same orthogonal reference signal set can be reused by the antennas that are separated far apart. However, this static reuse within a DAS or CoMP cell cluster fails to fully exploit the ability of the processing center to dynamically optimize pilot signal assignments.

SUMMARY

The inventive methods and apparatus disclosed herein allocate and assign uplink reference signals to cells within a cell cluster based on the type of cell. More restrictions are placed on border cells which adjoin one or more neighboring cell clusters as compared to interior cells which are separated from neighboring cell clusters by the border cells. In one embodiment, the process of assigning allocated uplink reference signal is divided into two parts. The first part involves statically or semi-dynamically assigning uplink reference signals to mobile devices served within the border cells. The second part involves dynamically assigning reference signals to mobile devices served within the interior cells. This way, the assignment of uplink reference signals within different antenna coverage areas within a cell cluster is a function of antenna location within the cluster. Antennas located in cells which adjoin neighboring cell clusters are under greater restriction whereas interior antennas have less restriction. Under such conditions, the cell cluster processing center can assign uplink reference signals to terminals within the cluster in an optimal way. The static or semi-dynamic reference signal assignments made at the border cells can be signaled to the neighboring cell cluster(s) and/or to some other node in the network, e.g. an operation and maintenance node or a self optimizing network node to improve coordination between neighboring cell clusters.

According to an embodiment, uplink reference signals are allocated within a cell cluster by partitioning a set of uplink reference signals allocated to the cell cluster into mutually exclusive subsets of uplink reference signals. One of the subsets is allocated to each of the border cells and the entire set of uplink reference signals is allocated to the interior cells. Accordingly, more uplink reference signals are available for assignment to terminals served by the interior cells than by the border cells.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
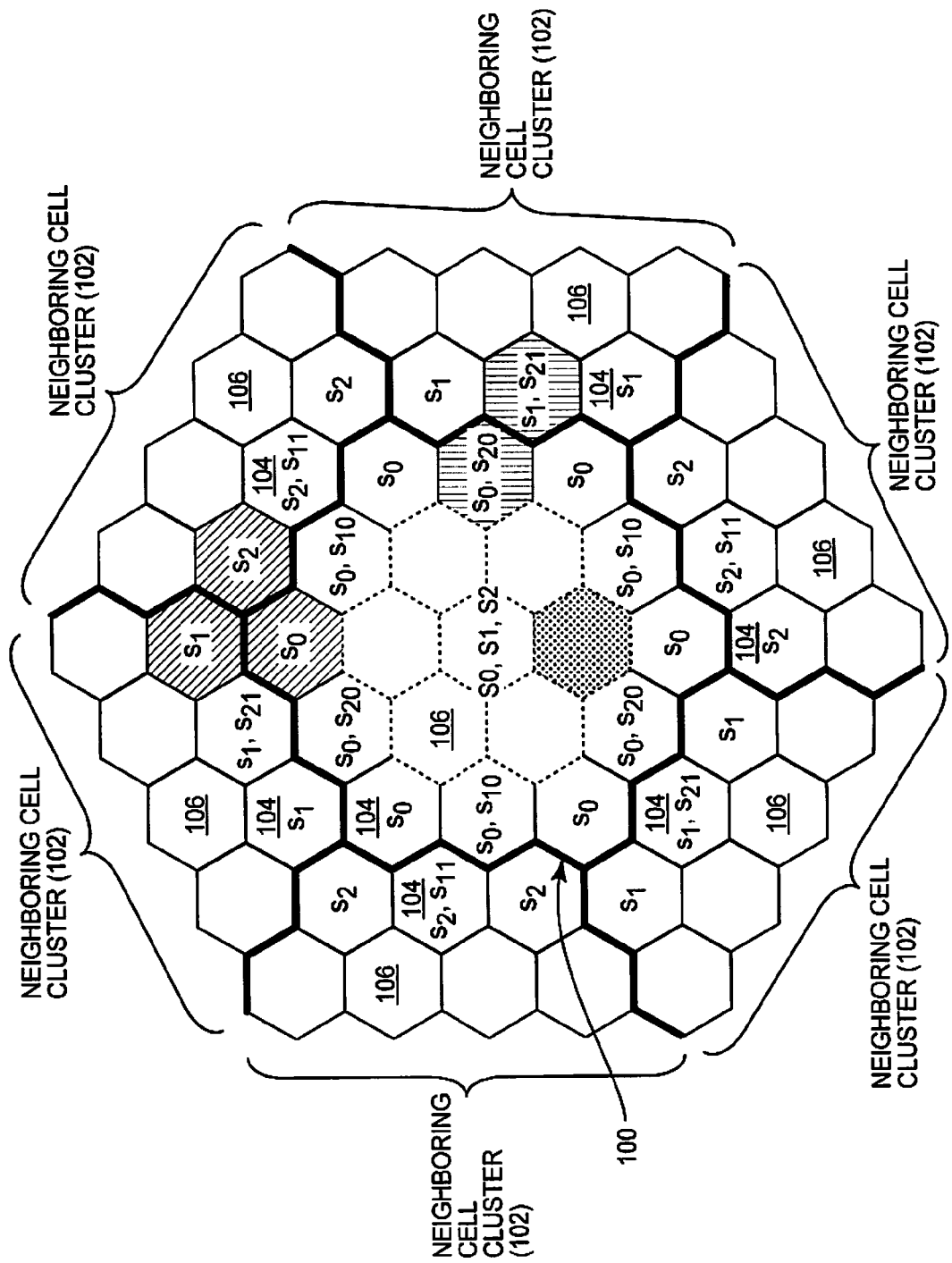
FIG. 1 illustrates a block diagram of an embodiment of a cell cluster having border cells and interior cells.

FIG. 1 illustrates an embodiment of a cell cluster 100 surrounded by neighboring cell clusters 102. In one embodiment, each cell cluster 100, 102 has a network controller (not shown in FIG. 1) connected to multiple distributed antennas (also not shown in FIG. 1) having radiation coverage areas 104, 106 herein referred to as cells which are represented by the hexagonal regions of FIG. 1. In general, the cells 104, 106 may have shapes other than hexagonal. The middle cell cluster 100 has border cells 104 adjoining cells in one or more of the neighboring clusters 102 and interior cells 106 separated from the neighboring clusters 102 by the border cells 104. The border cells 104 of the middle cluster 100 are shown with solid lines and the interior cells 106 with dashed lines in FIG. 1 for ease of illustration. Three different types of interfering cell conditions occur in each cell cluster 100, 102. The type of interference experienced by a particular cell 104, 106 depends on whether the cell 104, 106 borders a single neighboring cell cluster 102, borders more than one neighboring cluster 102 or borders no neighboring cluster 102. The first two types of interfering cell conditions arise within the border cells 104 and the third type occurs within the interior cells 106.

In more detail, the first type of interfering cell condition arises in the border cells 104 which adjoin cells belonging to two different neighboring cell clusters 102. These border cells 104 are also referred to herein as type-1 border cells. Three of the border cells 104 are marked with diagonal stripes in FIG. 1 to indicate they are type-1 border cells. The second type of interfering cell condition arises in the border cells 104 which adjoin cells belonging to one neighboring cell cluster 102. These border cells 104 are also referred to herein as type-2 border cells. Two of the border cells 104 are marked with vertical stripes in FIG. 1 to indicate they are type-2 border cells. The third type of interfering cell condition arises in the interior cells 106, one of which is marked with dots in FIG. 1. Uplink references signals are allocated to the different cells 104, 106 of the middle cell cluster 100 based on cell type so that performance is optimized and interference reduced.

Figure 2:
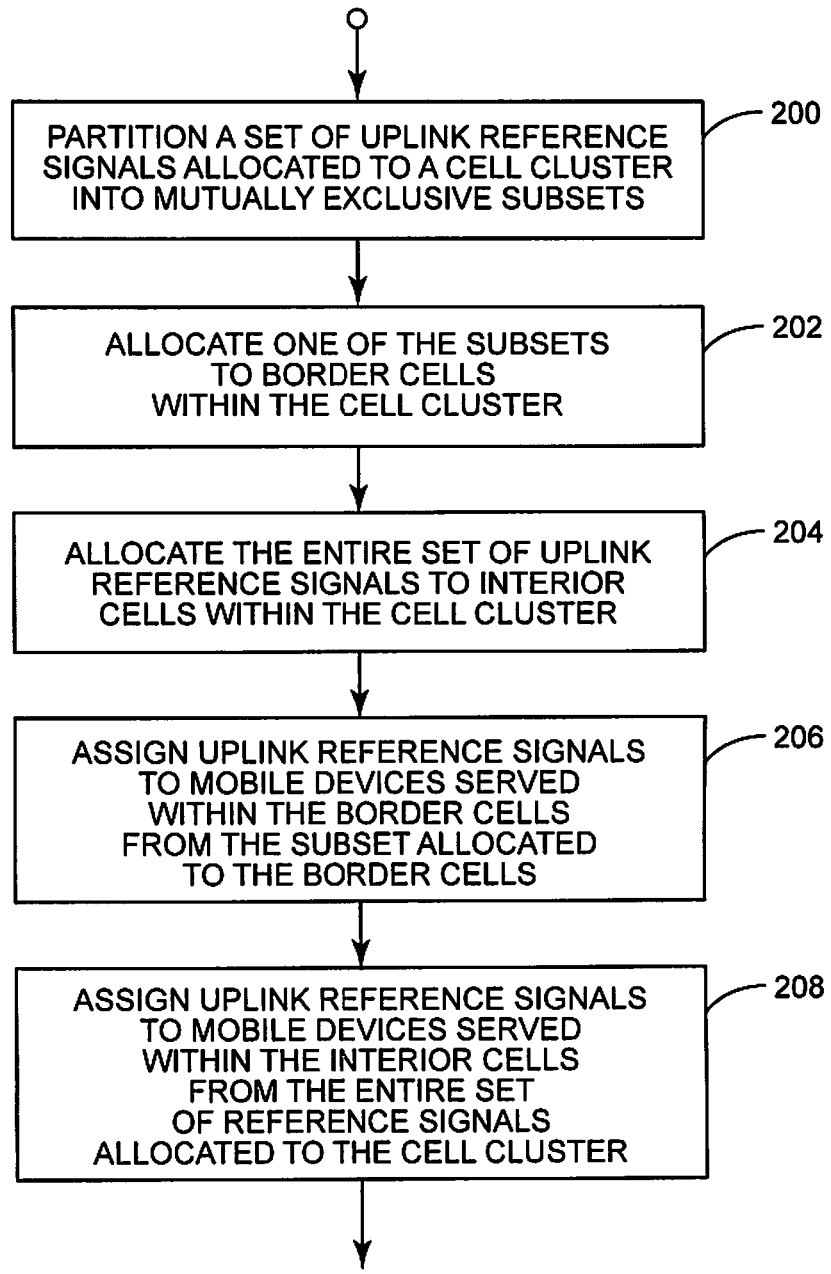
FIG. 2 illustrates an embodiment of a method for allocating and assigning uplink reference signals to border cells and interior cells of a cell cluster.

FIG. 2 illustrates an embodiment of a method for allocating uplink references signals within a cell cluster based on cell type and is described next with reference to FIG. 1. The method begins by partitioning a set of orthogonal uplink reference signals allocated to the middle cell cluster 100 into mutually exclusive subsets of uplink reference signals (Step 200). The original set of reference signals can be generated based on different cyclic shifts of a base sequence such as Zadoff-Chu sequence, m-sequence or Costas sequence. Alternatively, the set can be made orthogonal in the time-frequency domain for an Orthogonal Frequency Division Multiplexing (OFDM) system. Still other techniques may be used for generating the set of orthogonal uplink reference signals.

Based on the cell cluster layout shown in FIG. 1, the set of orthogonal uplink reference signals allocated to the middle cell cluster 100 is divided into three mutually exclusive subsets labeled S0, S1 and S2 in FIG. 1. In general, the set may be divided into any desirable number of subsets based on the layout of the cell cluster under consideration. The subsets are allocated to the different cells 104, 106 of the middle cluster 100 based on cell type. According to an embodiment, one of the subsets is allocated to each of the border cells 104 (Step 202). FIG. 1 shows one embodiment where the same subset S0 is allocated to each of the border cells 104 of the middle cell cluster 100. However, either subset S1 or S2 could also be assigned to the border cells 104 of the middle cluster 100. The uplink reference signal allocations made at the border cells 104 of the middle cell cluster 100 can be signaled to the neighboring cell clusters 102, e.g. over the X-2 interface. In one embodiment, an index value identifying the border cell subset allocations is signaled to the neighboring cell clusters 102. The neighboring cell clusters 102 can use the index to identify which subset has been allocated to the border cells 104 of the middle cluster 100, e.g. by using the index value to search a look-up table of reference signal subsets. The neighboring cell clusters 102 can use this knowledge of subset allocations to ensure their respective border cells 104 are allocated a subset of mutually exclusive uplink reference signals, thereby reducing interference between border cells 104 of adjoining cell clusters.

In one embodiment, additional uplink reference signals can be allocated to the type-2 border cells 104 of the middle cell cluster 100, i.e., the border cells 104 which adjoin cells belonging to one neighboring cell cluster 102. Two type-2 border cells 104 are identified in FIG. 1 with vertical stripes for ease of illustration. For the type-2 border cells 104, the entire reference signal set allocated to the middle cell cluster 100 need only be partitioned into two subsets. This can be achieved by further dividing each of the three subsets S0, S1 and S2 into two mutually exclusive subsets. In one embodiment, a portion of a second one of the subsets is allocated to the type-2 border cells 104. For example, subset S2 can be divided into S20 and S21. Doing so makes available two larger mutually exclusive subsets [S0, S20] and [S1, S21] for allocation to the neighboring type-2 border cells 104 as represented by the border cells 104 highlighted with vertical stripes in FIG. 1. The additional uplink reference signal allocations made to the type-2 border cells 104 of the middle cluster 100 can be signaled to the neighboring cluster 102 to indicate that the remaining portion S21 of the second subset S2 is available for allocation to its type-2 border cells 104. This way, the neighboring type-2 border cell 104 can be allocated the remaining portion S21 of the second subset S2 as shown in FIG. 1. Allocating additional uplink reference signals to the type-2 border cells 104 enables the type-2 border cells 104 to serve more mobile devices (not shown in FIG. 1).

The interior cells 106 have fewer restrictions placed on them as compared to the border cells 104 regarding uplink reference signal allocations and assignments. Unlike the border cells 104, the entire set of uplink reference signals is allocated to the interior cells 106 of the middle cell cluster 100 because the neighboring cell clusters 102 do not interfere with the interior cells 106 (Step 204). As such, more uplink reference signals can be allocated to the interior cells 106 of the middle cell cluster 100 than to the border cells 104. Mobile device activity within the neighboring cell clusters 102 has a profound affect on the level of interference caused in the border cells 104 of the middle cluster 100, but has no appreciable affect on the level of interference within the interior cells 106 of the middle cluster 100. In addition, communication between adjoining cell clusters 100, 102 is slower than it is within the same cell cluster. For example, neighboring cell clusters 100, 102 may communicate over the X-2 interface which is slower than the internal node interfaces within the same cell cluster. Thus, information relating to mobile device activity within the same cell cluster is more current than mobile device activity information received from a neighboring cell cluster. Accordingly, more uplink reference signals can be allocated within the interior cells 106 and assigned more frequently than in the border cells 104 of a cell cluster.

After the uplink reference signals are allocated to the border and interior cells 104, 106 of the middle cell cluster 100, mobile devices served within the middle cluster 100 are assigned uplink reference signals from the reference signals allocated to the cells 104, 106 in which the devices are located. Particularly, different ones of the uplink reference signals included in the subset allocated to the border cells 104 are statically or semi-dynamically assigned to mobile devices served within the border cells 104 (Step 206). For example, consider FIG. 1 where the subset S0 is allocated to the type-1 border cells 104 and the larger subset including S0 and S20 is allocated to the type-2 border cells 104 of the middle cell cluster 100. Uplink reference signals included in the subset S0 are assigned to mobile devices served within the type-1 border cells 104 based on mobile device activity within those border cells 104. More reference signals are available for assignment to mobile devices served within the type-2 border cells 104 based on mobile device activity within the type-2 border cells 104. On the other hand, the entire set of reference signals is available for assignment to mobile devices served within the interior cells 106 of the middle cell cluster 100 based on mobile device activity within the interior cells 106 (Step 208). Again considering FIG. 1, each of the subsets S0, 51 and S2 is allocated to the interior cells 106 of the middle cell cluster 100 and thus all of the uplink reference signals are available for assignment to mobile devices located in the interior cells 106 without causing interference to any of the neighboring cell clusters 102. Uplink reference signal assignments can be made dynamically to mobile device located in the interior cells 106 to minimize interference subject to the constraint that mobile devices located in the border cells 104 may be restricted to subsets of the entire reference signal set. Uplink reference signals can be dynamically assigned to mobile device located in the interior cells 106 because there is no interference from neighboring cell clusters 102 and information relating to own-cluster interference is well understood and updated often.

Figure 3:
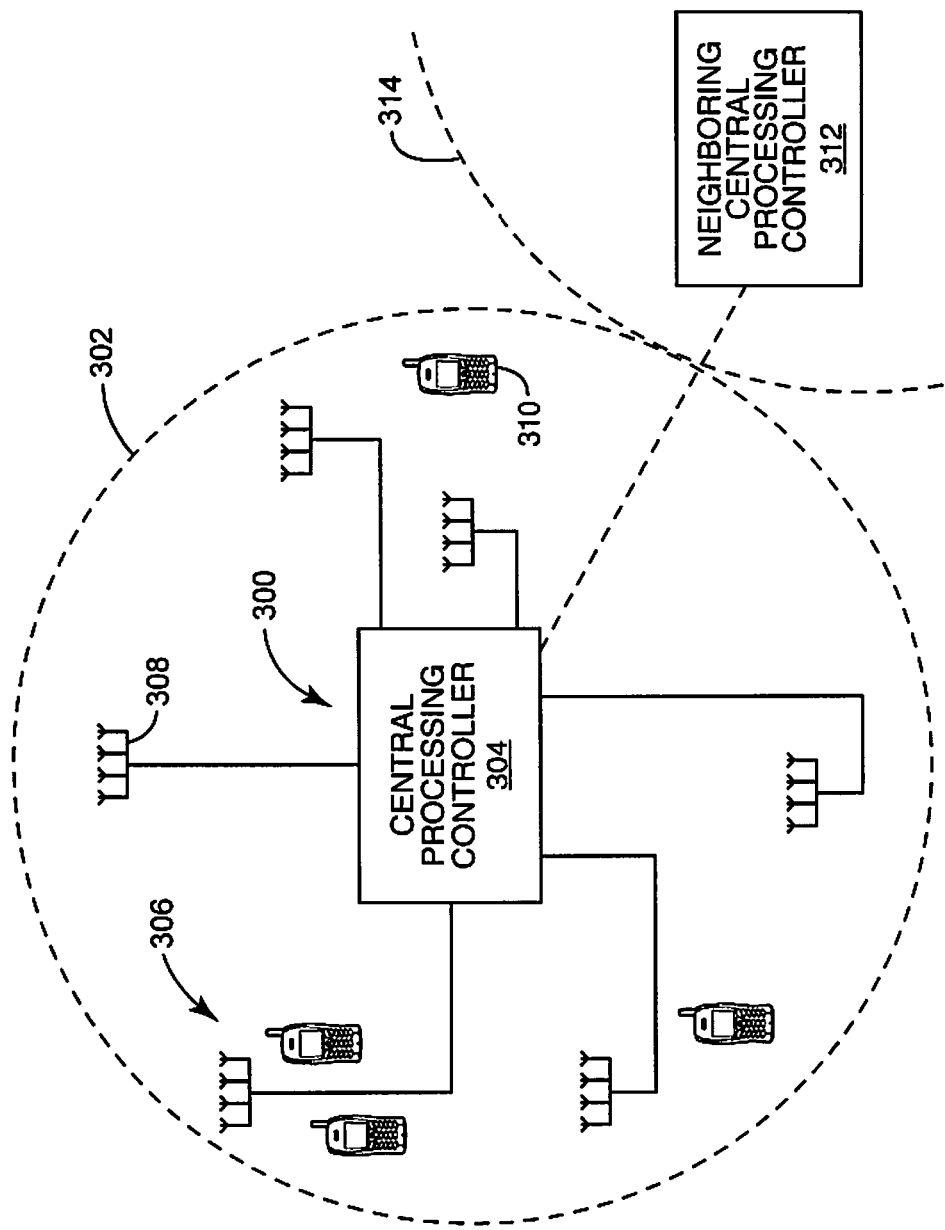
FIG. 3 illustrates a block diagram of an embodiment of a centralized processing controller for controlling operation of a plurality of widely dispersed antennas.

FIG. 3 illustrates an embodiment of a wireless network apparatus 300 for controlling a cell cluster 302 such as those shown in FIG. 1. According to this embodiment, the wireless network apparatus 300 comprises a centralized processing controller 304 such as a DAS or CoMP controller. The centralized processing controller 304 controls a distributed antenna system 306 located within the cell cluster 302. The distributed antenna system 306 includes a plurality of spaced apart antennas 308 which cover the different cells of the cluster 302. Some of the antennas 308 cover border cells (not shown in FIG. 3) while other antennas cover interior cells (also not shown in FIG. 3). The centralized controller 304 partitions a set of orthogonal uplink reference signals allocated to the cell cluster 302 into mutually exclusive subsets, allocates one of the subsets to each of the border cells and allocates the entire set of the uplink reference signals to the interior cells as described previously herein. This way, mobile devices 310 covered by the different antennas 308 are optimally served with minimal interference from neighboring cell clusters. In one embodiment, the centralized processing controller 304 signals the border cell subset allocations to a centralized processing controller 312 located in a neighboring cell cluster 314 also as described previously herein.

Figure 4:
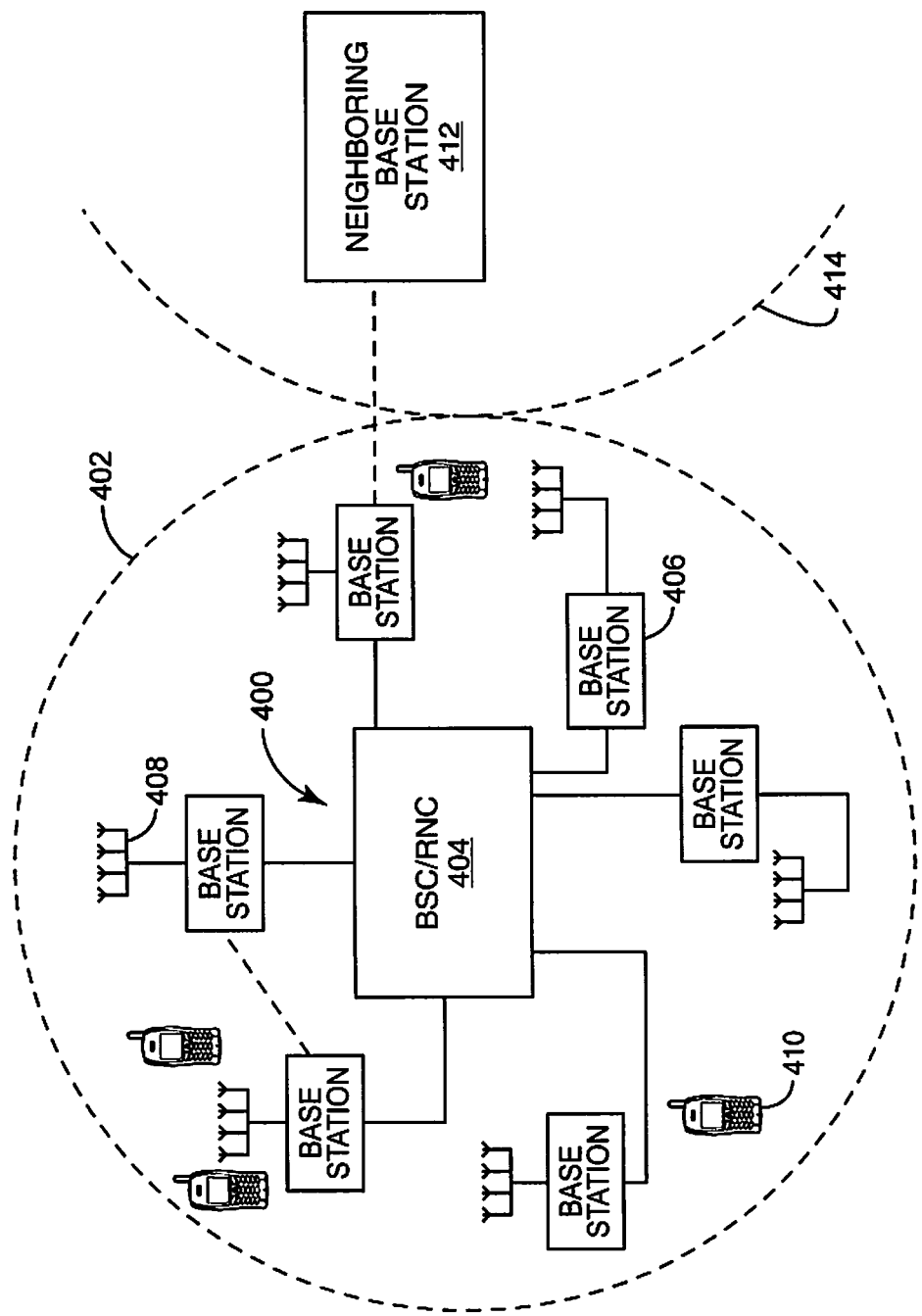
FIG. 4 illustrates a block diagram of an embodiment of a controller coupled to a plurality of radio base stations for controlling operation of a plurality of widely dispersed antennas.

FIG. 4 illustrates another embodiment of a wireless network apparatus 400 for controlling a cell cluster 402 such as those shown in FIG. 1. According to this embodiment, the wireless network apparatus 400 comprises a network controller 404 such as an RNC (Radio Network Controller) or BSC (Base Station Controller). The network controller 400 communicates with radio base stations 406 such as node Bs or enhanced node Bs. Each radio base station 406 interfaces with one or more antennas 408 and includes radio frequency transmitter(s) and receiver(s) used to communicate directly with mobile devices 410 within its coverage area, i.e., cell (not shown in FIG. 4). Some of the cells are border cells and others are interior cells as described previously herein. The network controller 404 partitions a set of orthogonal uplink reference signals allocated to the cell cluster 402 into mutually exclusive subsets, allocates one of the subsets to each of the border cells and allocates the entire set of the uplink reference signals to the interior cells also as described previously herein. This way, the mobile devices 410 served by the different radio base stations 406 within the cell cluster 402 are optimally served with minimal interference from neighboring cell clusters. In one embodiment, the network controller 404 instructs the base station 406 serving a border cell to signal the subset allocated to the border cell to a neighboring base station 412 located in a neighboring cell cluster 414, e.g. over the X-2 interface.

Figure 5:
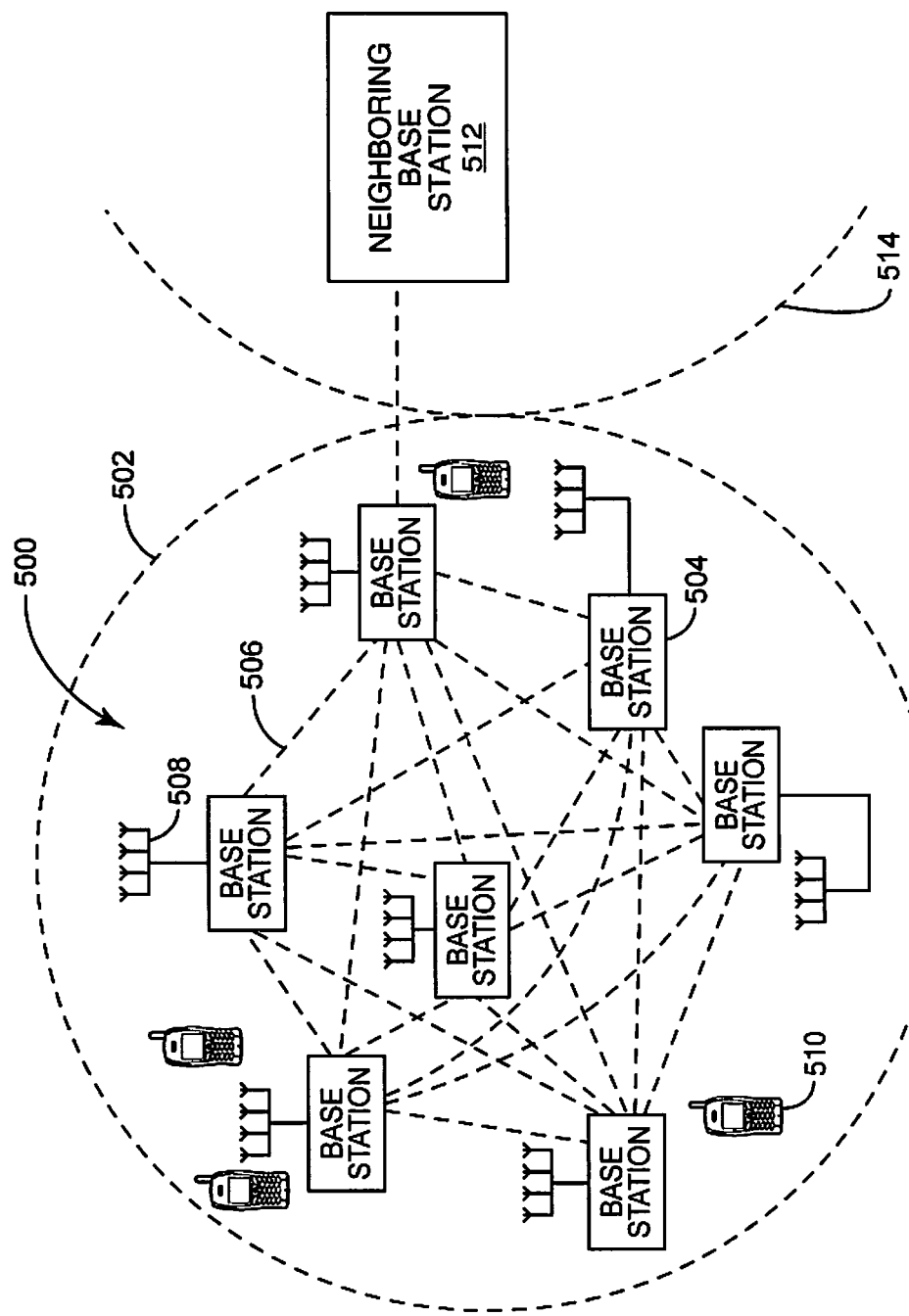
FIG. 5 illustrates a block diagram of an embodiment of a distributed radio base station configuration for allocating and assigning uplink reference signals to border and interior cells of a cell cluster.

FIG. 5 illustrates yet another embodiment of a wireless network apparatus 500 for controlling a cell cluster 502 such as those shown in FIG. 1. According to this embodiment, the wireless network apparatus 500 comprises a plurality of radio base stations 504 such as node Bs or enhanced node Bs which communicate with one another over a standardized or proprietary internal interface 506. Each radio base station 504 interfaces with one or more antennas 508 and includes radio frequency transmitter(s) and receiver(s) used to communicate directly with mobile devices 510 within its coverage area, i.e., cell (not shown in FIG. 5). Some of the cells are border cells and others are interior cells as described previously herein. According to this embodiment, a central controller is not used for allocating uplink reference signals to the different cells. Instead, one or more of the radio base stations 504 manage reference signal allocation.

In one embodiment, one of the radio base stations 504 partitions a set of orthogonal uplink reference signals allocated to the cell cluster 502 into mutually exclusive subsets, allocates one of the subsets to the radio base stations 504 serving the border cells and allocates the entire set of the uplink reference signals to the radio base stations 504 serving the interior cells via the internal interface 506 as described previously herein. In another embodiment, the radio base stations 504 jointly cooperate in a distributed manner via the internal interface 506 to partition the set of orthogonal uplink reference signals into mutually exclusive subsets and allocate one of the subsets to each of the border cells and allocate the entire set of the uplink reference signals to the interior cells as described previously herein. In each case, the mobile devices 510 served by the different radio base stations 504 within the cell cluster 502 are optimally served with minimal interference from neighboring cell clusters. Each radio base station 504 serving a border cell can signal the subset allocated to the border cell to a neighboring base station 512 located in a neighboring cell cluster 514, e.g. over the X-2 interface.

Static or semi-dynamic reuse of reference signal subsets in border cells avoids inter-cell cluster coordination and reduces inter-cell cluster reference signal interference. Dynamic assignment of uplink reference signals within the interior cells using all available signals, subject to the constraint of the static/semi-dynamic reuse in the border cells, enables maximal flexibility to avoid reference signal, thereby reducing channel estimation error. Signaling of reference signal allocation and assignment strategies between neighboring cell clusters allows for adaptation to operation conditions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of allocating uplink reference signals within a cell cluster using a distributed antenna system in combination with coordinated multipoint transmission and reception, said cell cluster having a plurality of border cells adjoining one or more neighboring cell clusters and a plurality of interior cells spaced apart from the neighboring cell clusters by the border cells, the method comprising:
    partitioning, using a controller within the cell cluster, a set of uplink reference signals allocated to the cell cluster into mutually exclusive subsets of uplink reference signals;
    allocating, using the controller, a first subset to each of the border cells;
    allocating, using the controller, a portion of a second subset to the border cells adjoining only one of the neighboring cell clusters; and
    allocating, using the controller, the entire set of the uplink reference signals to the interior cells.

2. The method of claim 1, further comprising:
    statically or semi-dynamically assigning, using the controller, different ones of the uplink reference signals included in the subset allocated to the border cells to mobile devices served within the border cells; and
    dynamically assigning, using the controller, different ones of the uplink reference signals included in the entire set to mobile devices served within the interior cells.

3. The method of claim 1, further comprising signaling, using the controller, to each neighboring cell cluster the subset allocations made at the adjoining border cells.

4. The method of claim 3, wherein the signaling to each neighboring cell cluster the subset allocations comprises signaling to each neighboring cell cluster an index value identifying the subset allocated to the adjoining border cells.

5. The method of claim 3, wherein the signaling to each neighboring cell cluster the subset allocations comprises signaling the border cell subset allocations from a base station located in the cell cluster to a base station located in each neighboring cell cluster.

6. The method of claim 3, wherein the signaling to each neighboring cell cluster the subset allocations comprises signaling the border cell subset allocations from a centralized processing center associated with the cell cluster to a centralized processing center associated with each neighboring cell cluster.

7. The method of claim 1, further comprising signaling, using the controller, to the neighboring cell cluster adjoining each border cell allocated a portion of the second subset that the remaining portion of the second subset is available for allocation within the neighboring cell cluster.

8. A wireless network apparatus for use within a cell cluster having a plurality of border cells adjoining one or more neighboring cell clusters and a plurality of interior cells spaced apart from the neighboring cell clusters by the border cells, the wireless network apparatus comprising a controller configured to:
    partition a set of uplink reference signals allocated to the cell cluster into mutually exclusive subsets of uplink reference signals,
    allocate a first subset to each of the border cells;
    allocate a portion of a second subset to the border cells adjoining only one of the neighboring cell clusters, and
    allocate the entire set of the uplink reference signals to the interior cells.

9. The wireless network apparatus of claim 8, wherein the controller is further configured to statically or semi-dynamically assign different ones of the uplink reference signals included in the subset allocated to the border cells to mobile devices served within the border cells and dynamically assign different ones of the uplink reference signals included in the entire set to mobile devices served within the interior cells.

10. The wireless network apparatus of claim 8, wherein the controller is further configured to signal to each neighboring cell cluster the subset allocations made at the adjoining border cells.

11. The wireless network apparatus of claim 10, wherein the controller is configured to signal to each neighboring cell cluster an index value identifying the subset allocated to the adjoining border cells.

12. The wireless network apparatus of claim 10, wherein the controller is configured to instruct a base station serving one of the border cells in the cell cluster to signal the subset allocated to the border cell to a neighboring base station located in one of the neighboring cell clusters.

13. The wireless network apparatus of claim 10, wherein the controller comprises a centralized processing controller configured to control a distributed antenna system located within the cell cluster.

14. The wireless network apparatus of claim 13, wherein the centralized processing controller is configured to signal the border cell subset allocations to a centralized processing controller located in each neighboring cell cluster.

15. The wireless network apparatus of claim 8, wherein the controller is further configured to signal to the neighboring cell cluster adjoining each border cell allocated a portion of the second subset that the remaining portion of the second subset is available for allocation within the neighboring cell cluster.

* * * * *